United States Patent [19]
Mueller

[11] 3,914,397
[45] Oct. 21, 1975

[54] PRODUCTION OF CHLORINE MONOXIDE GAS

[75] Inventor: Walter A. Mueller, Dorval, Canada

[73] Assignee: Pulp and Paper Research Institute of Canada, Pointe Claire, Canada

[22] Filed: Dec. 14, 1973

[21] Appl. No.: 424,653

Related U.S. Application Data

[63] Continuation-in-part of Ser. No. 168,030, Aug. 2, 1971, abandoned.

[30] Foreign Application Priority Data

Aug. 5, 1970 United Kingdom............... 37803/70

[52] U.S. Cl. ............... 423/462; 423/427; 423/438; 423/499; 423/579
[51] Int. Cl.$^2$......................................... C01B 11/02
[58] Field of Search .......... 423/462, 472, 427, 438, 423/499, 579

[56] References Cited
UNITED STATES PATENTS

| | | | |
|---|---|---|---|
| 2,157,524 | 5/1939 | Cady | 423/462 |
| 2,157,525 | 5/1939 | Cady | 423/462 |
| 2,240,342 | 4/1941 | Muskat et al. | 423/474 |
| 3,482,934 | 12/1969 | Di Bello et al. | 423/427 |
| 3,719,745 | 3/1973 | Saeman | 423/427 |

FOREIGN PATENTS OR APPLICATIONS

765,602   1/1957   United Kingdom............... 423/427

*Primary Examiner*—Edward Stern
*Attorney, Agent, or Firm*—Depaoli & O'Brien

[57] ABSTRACT

A process is provided for preparing $Cl_2O$ in high yields. A particularly recited, highly reactive, porous open structure form of a suitable alkaline agent, e.g. one having a surface area within the range of about 0.3 to about 5.2 m$^2$/g is reacted with not more than a stoichiometric amount of chlorine gas in the form of a mixture of dry gaseous chlorine and moist diluent gas consisting essentially of air, oxygen, nitrogen, and mixtures thereof, at a temperature of $-20°C$. to $+30°C$., preferably at 0°C. to 20°C. The moistened diluting gas may preferably be moistened by passing it through water at a controlled temperature prior to being used as the diluent. One example of suitable alkaline agent is a sodium carbonate of special characteristics, either purchased or produced from commercially available sodium bicarbonate or sodium sesquicarbonate. Another example of suitable alkaline agent is a specially formed sodium carbonate produced from sodium bicarbonate derived from green liquor from a pulp mill.

9 Claims, 6 Drawing Figures

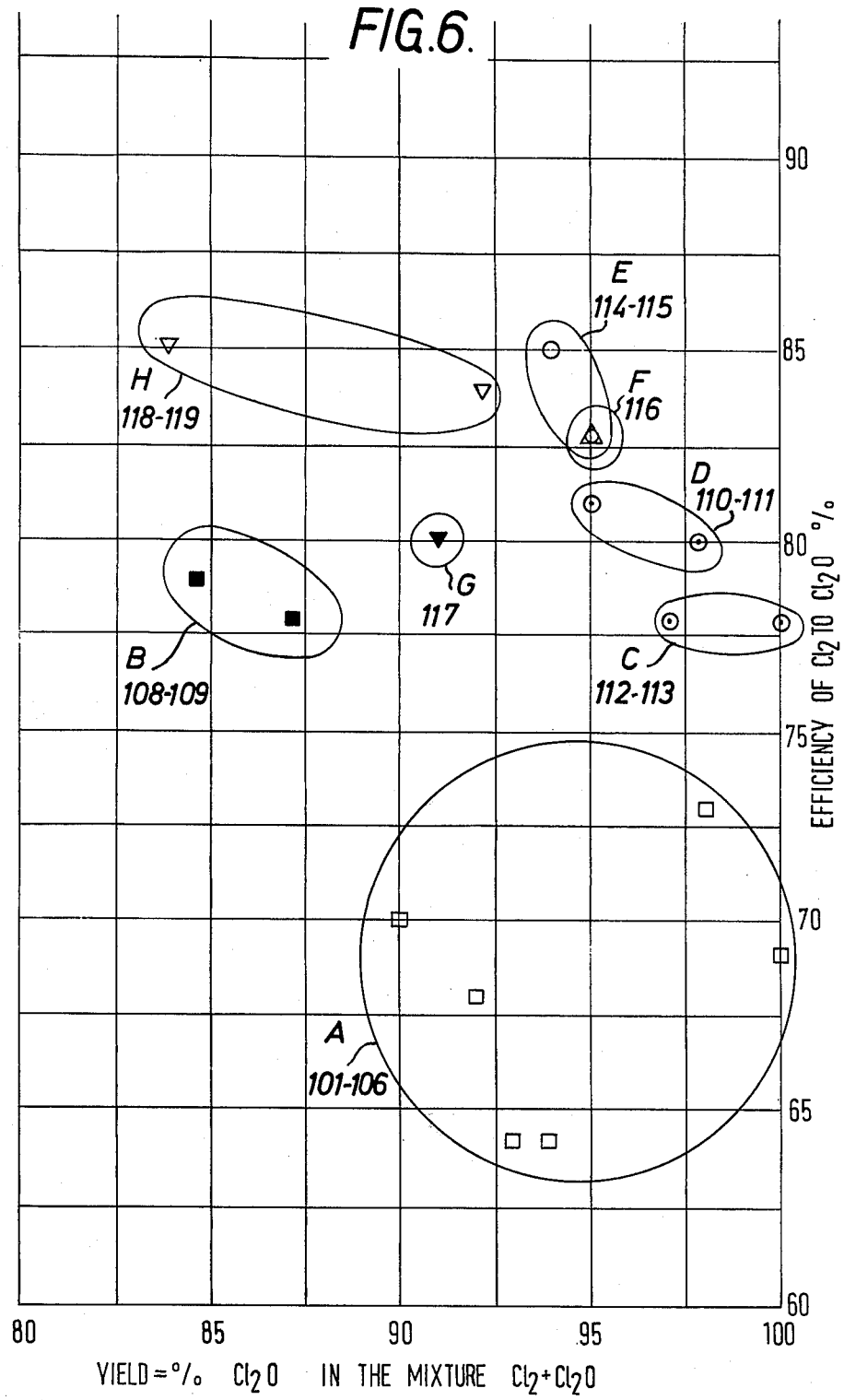

PRODUCTION OF CHLORINE MONOXIDE GAS

RELATED APPLICATION

This application is a continuation-in-part of application Ser. No. 168,030, filed Aug. 2, 1971, now abandoned.

BACKGROUND OF THE INVENTION

FIELD OF THE INVENTION

This invention relates to a process for the production of chlorine monoxide in high yields. It is particularly concerned with a process for producing the chlorine monoxide gas at an extremely high yield and at a high efficiency of production, heretofore never achieved.

UTILITY OF THE INVENTION

A safe process for bleaching a fibrous cellulosic pulp has been developed, which comprises contacting the pulp at high consistency and in the form of fluffed or shredded fibres and fibre aggregates with chlorine monoxide in the gaseous phase. While chlorine monoxide is thus primarily useful in the bleaching of fibrous cellulosic material, it is also useful for the production of calcium hypochlorite and such organic compounds as tert. butyl-hypochlorite.

DEFINITIONS

A. As used herein, the term "per cent yield" is synonymous with chlorine monoxide percentage in the chlorine monoxide-containing portion of the gaseous product, i.e. it is intended to mean per cent of $Cl_2O$ in the gas mixture of $Cl_2O + Cl_2$. This amount is equal to $100 \times (cl_2O)/[(Cl_2O)_2 + (Cl_2)]$, the amounts of $Cl_2O$ and $Cl_2$ each being expressed in terms of grams Cl.

B. As used herein, the term "efficiency of production" is intended to mean $100 \times (cl_2O)/[1/2(Cl_2O) + 1/2(NaCl)]$, the amounts of $Cl_2O$ and NaCl each being expressed in terms of grams Cl.

C. As used herein, the term "consistency" is intended to mean its usual, art-accepted meaning, namely $$\% \text{ consistency} = \frac{\text{oven dried weight}}{\text{weight of water + weight of pulp}}$$

DESCRIPTION OF THE PRIOR ART

The following United States Patents, namely: U.S. Pat. No. 2,240,342 issued Apr. 29, 1941 to Muskat and Cady; U.S. Pat. No. 2,157,524 issued May 9, 1939 to Cady; and U.S. Pat. No. 2,157,525 issued May 9, 1939 to Cady described the production of $Cl_2O$ gas by reacting $Cl_2$ gas with either solid salts or hydroxides of alkali metals. Specifically, a gas mixture of 10 to 25% $Cl_2$ in air (or $N_2$, $O_2$ or $CO_2$) reacted at 20°C. to 30°C. with sodium carbonate in the presence of 10 to 15 percent water dispersed throughout the solid alkali metal compound, produces $Cl_2O$ gas. It was taught that dry sodium carbonate may also be used either at an ambient temperature of 20°C. to 30°C., or at an elevated reaction temperature of 150°C. to 200°C. This process was efficient but it was far from successful since the yields of $Cl_2O$ in the generated gas mixture of $Cl_2O$ and $Cl_2$ were extremely low, 14 percent at the most.

SUMMARY OF THE INVENTION

Advantages and Aims of the Invention

An object, then, of one broad aspect of this invention is the provision of a process for preparing $Cl_2O$ gas on a large scale and in high yields of 90 percent or more, while maintaining a high efficiency of $Cl_2O$ production, of 80 percent or more.

An object of another aspect of this invention is the provision of such a process in which the $Cl_2O$ may be directly recovered in gaseous form and also in a safe manner.

An object of yet another aspect of this invention is the provision of such a process in which the required amount of solids reactant is reduced to a minimum by using a special form of the solids, prepared in such a manner that they are very porous and high reactive, and in which the production of less reactive solids is suppressed.

An object of still another aspect of this invention is the provision of such a process in which the required amount of such solids and of gaseous chlorine reactant is reduced to a minimum by the suppression of such side reactions as the production of chlorates or oxygen.

An object of yet another aspect of this invention is the provision of such a process of improved safety which involves the use of dry solids that react with a gaseous reagent, namely dry chlorine mixed with moistened diluting gas.

Broad Statement of the Invention

By a broad aspect of this invention, a process is provided for directly preparing chlorine monoxide in high yields in which the molar ratio of chlorine monoxide is not less than about 80 percent which comprises the combination of reacting (A) a solid compound selected from the group consisting of the carbonates and bicarbonates, of the alkali metals, such solids being in a dry, highly reactive open-structure form, having a surface area within the range of about 0.3 to about 5.2 m²/g, with (B) close to, but not substantially more than, about a stoichiometric amount of chlorine gas in the form of dry gaseous chlorine and moist diluent gas consisting essentially of air, oxygen and nitrogen and mixtures thereof, at (C) a temperature of about −20°C. to about +30°C., while (D) maintaining the pH at 9.5 or higher.

Other Variants of the Invention

By another aspect of this invention, the solid compound is sodium carbonate formed by heating sodium bicarbonate to temperatures of about 100°C. to about 550°C. while removing the gaseous reaction products so formed.

By still another aspect of this invention, the solid compound is sodium carbonate formed by the steps of: contacting an aqueous green liquor containing, as main components, $Na_2S$ and $Na_2CO_3$ and residual salts including NaCl, $Na_2S_2O_3$, $Na_2SO_3$, $Na_2SO_4$ and NaOH with carbon dioxide gas; subjecting the tail solution comprising a slurry of $NaHCO_3$ particles to filtration and returning a fraction of the washed tail solution to be mixed with additional smelt in s separate section of the smelt dissolving tank so as to prevent it mixing with the green liquor; drying and pulverizing the $NaHCO_3$; and subjecting the $NaHCO_3$ so formed to the action of heat within the range of about 100°C. to about 550°C., while substantially simultaneously removing gases developed, thereby providing a gaseous mixture containing carbon dioxide for use in the carbonation reaction with the green liquor, and finely divided highly porous active sodium carbonate.

By a still further aspect of this invention, the diluent gas has a moisture content of about 5 to about 95 percent relative humidity increasing with decreasing temperature, preferably by passing it through an aqueous medium, most preferably at a temperature of about 0°C.

By a further aspect of this invention, the v/v ratio of moist diluent/$Cl_2O$ in the product gas is at least about 77/23. By yet another aspect of this invention, the v/v ratio of moist diluent/$Cl_2$ gas in the reactant gas is about 80/20'. By still another aspect of this invention, the reaction temperature is about 0°C., the partial pressure of water vapour is about 2.5 to 7.0 mm Hg, and the moist mixture gas and dry chlorine gas is maintained at about −30°C. to about +30°C.

GENERALIZED DESCRIPTION OF THE INVENTION

It has now been found that it is possible to produce $Cl_2O$ gas at a highly improved yield, i.e. % chlorine monoxide in the chlorine monoxide-containing portion of the product gases of about 90% or more, while maintaining a high efficiency of $Cl_2O$ production, i.e. the % chlorine monoxide product in the product stream comprising chlorine monoxide and sodium chloride, of about 80 percent or more, by reacting a mixture of a dry chlorine gas and a moistened diluting gas with a highly reactive form of sodium carbonate which has been pretreated to its desired form. This pretreatment may either be done by the mill producing the $Cl_2O$ or it may be done by the supplier, by calcining the bicarbonate or the sesquicarbonate, to produce a light soda ash in a process as described in the following specification. The moistened diluting gas can be either oxygen, nitrogen or air, but not carbon dioxide. In particular, it has been found that by pretreating sodium bicarbonate or sodium carbonate containing water of crystallization in a vacuum and/or at elevated temperatures, the salt is converted to a dry, porous, very reactive, sodium carbonate having a strongly enlarged surface area necessary for obtaining the improved yield. Furthermore, the amount of reactive, pretreated solids used is sufficient to satisfy the stoichiometric equation.

It has been discovered that many interrelated parameters are important for preparing $Cl_2O$ gas in high yields. The solid reagent must be a highly reactive porous form of a suitable alkaline agent. Alkaline agents include sodium carbonate, sodium bicarbonate, sodium sesquicarbonate, potassium carbonate, potassium bicarbonate, potassium sesquicarbonate, lithium carbonate, lithium bicarbonate, lithium sesquicarbonate, sodium phosphate, sodium silicate and potassium silicate. In practice, it is usually sodium carbonate, sodium sesquicarbonate or sodium bicarbonate. Preferably, it is sodium carbonate produced by the decomposition of sodium bicarbonate or sodium sesquicarbonate in a manner to be described hereinafter. To be in highly active, porous form, the solid have a surface area of about 0.3 to about 5.2 m²/g and should have a specific gravity (weight per volume of powder) of about 1.06 to about 0.635 g/cm³. The amount of such solid reagent required is the stoichiometric amount or even a stoichiometric excess of solids.

The chlorine gas is diluted with moist oxygen, nitrogen or air. Carbon dioxide, which is produced in addition to chlorine monoxide by the reaction of chlorine with sodium carbonate, must not be used as a diluent, and should therefore be avoided or, at least, kept at a very minimum concentration. For safety reasons, the amount of diluent required is sufficient to provide a v/v ratio of diluent/$Cl_2O$ gas of at least about 77/23. In practice, this may be achieved by having a v/v ratio of diluent/$Cl_2$ of at least about 80/20, since $2Cl_2$ cannot produce more than $1Cl_2O$.

The reaction temperature and contact time are correlated to provide a substantial amount, e.g. about 90 percent or more, of $Cl_2O$ in the reactant effluent. The temperature usually ranges from about −20°C. to about +30°C., and, optimumly, from about 0°C. to about 20°C. The contact time for a reaction carried out at about 0°C. to about 20°C. is about 15 seconds.

The reactions leading to the production of $Cl_2O$ gas according to the process of one embodiment of this invention are generally known:

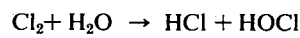

(1)

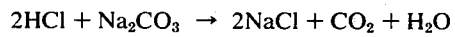

(2)

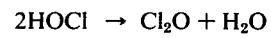

(3)

and the overall equation is:

(4)

Water, which is introduced in the reaction by moistening the diluent gas, acts as a catalyst only; it does not appear in the overall equation. In the absence of water in the moistened diluent gas, no $Cl_2O$ is produced. Hence, if the solids and the chlorine gas are maintained dry, even the accidental use of 100 percent undiluted chlorine gas would not produce an explosive gas mixture containing over about 23% chlorine monoxide, while the accidental use of 100 percent, undiluted but moist chlorine gas would, in all likelihood, produce such explosive gas mixture.

In order to reach high efficiency as defined hereinabove, one must also control the side reactions which can take place. If certain catalytic ions, for example, Ni, Co, and/or Cu, are present in the solid, $O_2$ would be produced instead of $Cl_2O$, according to the reaction:

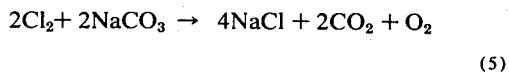

(5)

This reaction is practically eliminated by the removal of these undesirable ions. Another undesirable side reaction occurs as follows:

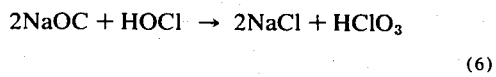

(6)

The production of these products, i.e. sodium chlorate and chloric acid increases rapidly with the numerical value of the square of the concentration of NaOCl times the concentration of HOCl, i.e. with the content or concentration of $Cl_2O$, and follows the overal chemical equation:

$$3Na_2CO_3 + 3Cl_2 \rightarrow NaClO_3 + 5NaCl + 3CO_2 \quad (7)$$

This reaction, which occurs in aqueous solution, is due to the inefficient use and control of $Cl_2$ in the reaction, i.e. the $Cl_2$ reacted which produces undesirable Cl-containing products which may be designated loss of $Cl_2$. This side reaction can be controlled by maintaining the reaction at a high pH. As an example, if the reaction temperature is increased from about 0°C. to about 20°C., the relative humidity of the gas mixture must be decreased from about 70 to about 20 percent, while maintaining a partial pressure of about 2.5 to about 8 mm Hg water vapour by comparison with 2.5 to 7.0 mm Hg at about 0°C., and a pH of about 9.5 or higher by comparison with a pH of about 8.5 or higher at about 0°C. in the film of moisture formed on the dry solids. (The pH is measured by withdrawing solid reactant product, dissolving it in water and then measuring the pH of the aqueous solution.) By doing so, the rate of this side reaction is kept low. As mentioned previously, this can be carried out by lowering the $CO_2$ present in the atmosphere. By incorporating the aforementioned changes in the basic, generally known, chemistry for producing $Cl_2O$ gas, applicant has been able to produce and recover $Cl_2O$ in gas form, either by a batch or by a continuous process in yields, i.e. % chlorine monoxide in the chlorine monoxide-containing portion of the product gases, of about 90 – 100 percent while maintaining a high efficiency of $Cl_2O$ production, i.e. the % chlorine monoxide product in the product stream comprising chlorine monoxide and sodium chloride, of about 80 percent or more, as compared to yields, i.e. % chlorine monoxide in the chlorine monoxide-containing portion of the product gases, of about 14 percent achieved by the processes of prior art.

In the case of the pretreatment of $NaHCO_3$ to provide the highly reactive, porous, open structure of specific gravity (weight per volume of powder) of about 0.635 to about 1.06 and surface area of 0.3 to 5.2, the sodium bicarbonate may be heated to a temperature of from about 100°C. to about 550°C. for about 1 hour or less depending on the temperature, (namely, the higher the temperature, the less the time), while being swept by gaseous nitrogen to remove the $CO_2$ and $H_2O$ vapour. On the other hand, it may be heated either under atmospheric pressure or under vacuum, in the presence of the gases formed by the decomposition reaction.

Since, during the pretreatment of sodium bicarbonate, $CO_2$ is produced in addition to water, it was found desirable to lower the $CO_2$ in the atmosphere in order to improve the rate of this reaction and to increase the pH level in any films of moisture on the surface of the solids where the reaction occurs.

The present invention may be operated in a manner different from the procedures of the prior art in the manner of recovery of the $Cl_2O$. In the past, this was done by dissolving the effluent in water and subsequently regenerating the $Cl_2O$. In the present invention, since at least about 90 percent of the $Cl_2$ reactant has been transformed into $Cl_2O$, the product effluent gas, containing about 77 percent or more diluent, with at least about 90 percent of the balance being $Cl_2O$, may be used directly as a bleaching agent.

BRIEF DESCRIPTION OF THE DRAWINGS

In the accompanying drawings:

FIG. 6 is a graph showing the superior results of continuous process according to an aspect of this invention compared to the procedures of the prior art and shown in FIG. 5.

DETAILED DESCRIPTION OF THE DRAWINGS

Figure 1:
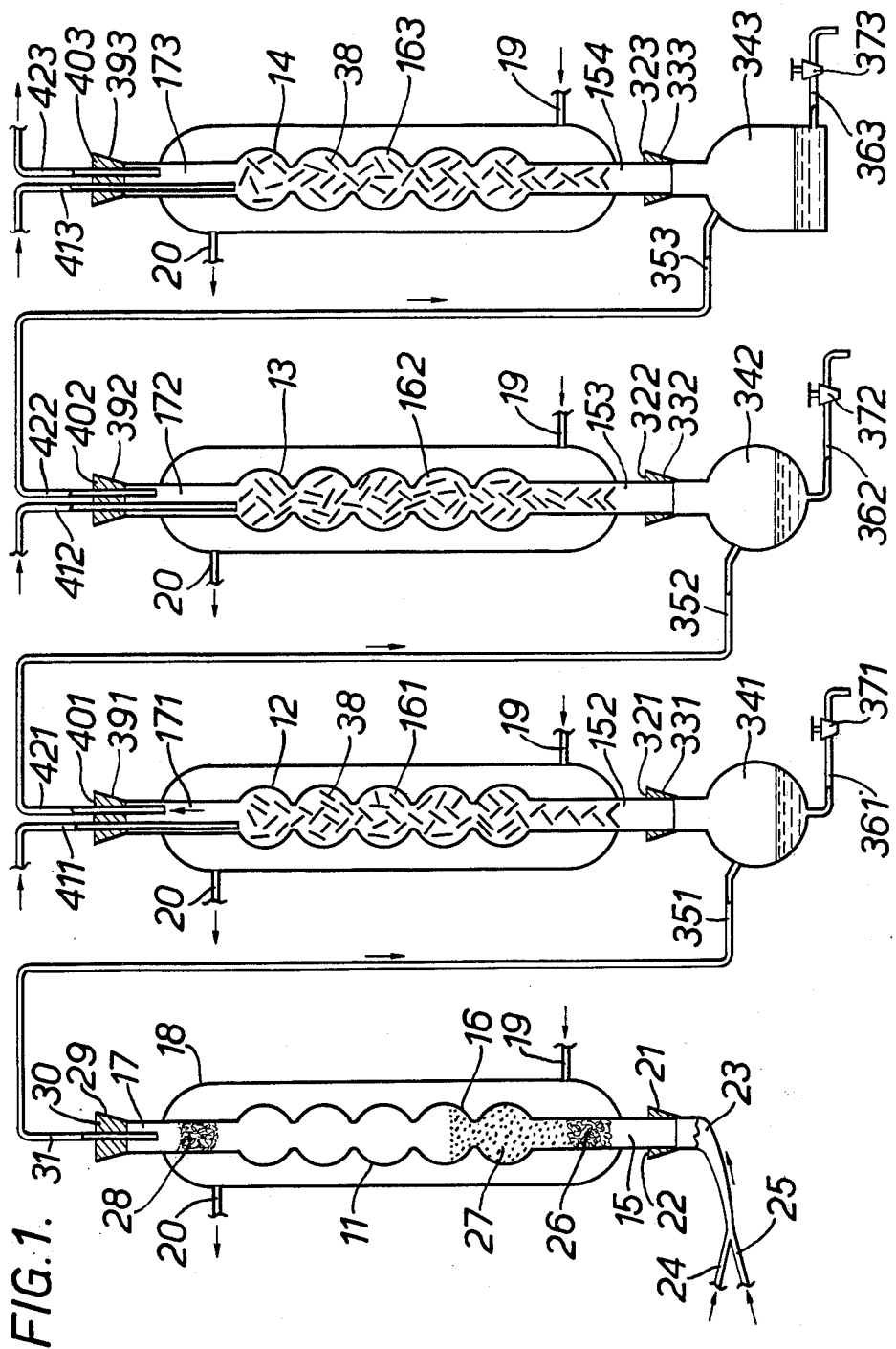
FIG. 1 is a diagram showing the laboratory equipment for producing $Cl_2O$ gas using a batch process according to an aspect of this invention.

Description of Figure 1

As seen in FIG. 1, the apparatus 10 includes four interconnected water-cooled vessels 11, 12, 13, 14. Each vessel includes an inlet section 15, a plurality of bulbous portions 16, i.e. five, and an outlet section 17. Each vessel also includes a water jacket 18 including cooling water inlet means 19 and water outlet means 20.

Inlet section 15 of reactor 11 is connected, via a gas-tight stopper 21, to the flared end 22 of an inlet conduit 23. Inlet conduit 23 is bifurcated to provide for the inlet of reactant gas ($Cl_2$) via line 24 and diluent gas ($N_2$, $O_2$ or air) via line 25 in the proper amounts.

The upper portion of inlet section 15 is packed with glass wool 26, upon which the solid reagent 27 rests, the solid reagent filling the bottom bulbous portion 16 and half the next one. The upper portion of the outlet section 17 of reactor 11 is packed with glass wool 28. The outlet of the outlet section is outwardly flared at 29 to be fitted with a gas-tight plug 30 into which is inserted outlet tube 31.

Vessel 12 is a primary absorption chamber and vessel 13 is a secondary absorption chamber, where the effluent gases from the reaction vessel 11 are contacted countercurrently with carbon tetrachloride. The construction of vessels 12 and 13 is the same.

The inlet sections 152, 153 of vessels 12, 13 are connected, via gas-tight stoppers 321, 322 to the flared ends 331, 332 of bulbous containers 341, 342 respectively. Containers 341, 342 are provided with gas inlet lines 351, 352 and liquid drain lines 361, 362, provided with stopcocks 371, 372 respectively. Bulbous sections 161, 162 of vessels 12, 13 respectively are each filled with inert materials for enhancing gas-liquid contact, and these inert materials may be, for example, small glass cylinders 38.

The outlet sections 171, 172 of vessels 12, 13 respectively, are outwardly flared at 391, 392, to be fitted with gas-tight plugs 401, 402, into which are inserted carbon tetrachloride admitting tubes 411, 412 which extend to the bottom of outlet sections 171, 172, and gas outlet tubes 421, 422, respectively.

Vessel 14 is a final gas washing chamber. The inlet section 154 of vessel 14 is connected, via gas-tight stopper 323 to the flared end 333 of the neck of storage vessel 343. Vessel 343 is provided with gas inlet line 353, and with liquid drain line 363 provided with drain cock 373.

Bulbous sections 163 are packed with small glass cylinders 38. The outlet section 173 is outwardly flared at 393, to be fitted with gas-tight plug 403, into which is inserted solvent admitting tube 413 which extends to the bottom of section 173, and gas exhaust tube 423.

Outlet tube 31 is connected to gas inlet line 351 of bulbous container 341. Outlet tube 421 is connected to gas inlet line 352 of bulbous container 342, and outlet tube 422 is connected to gas inlet 353 of storage vessel 343.

In operation, the reactant gas ($Cl_2$) in line 24 and diluent gas ($N_2$, $O_2$ or air) in line 25 mix in inlet conduit 23 and pass in reactant contact, at the controlled reaction temperature, with solid reactant 27. The effluent gas passes via outlet tube 31 to bulbous container 341. The gas passes, upwardly through primary absorption chamber 12 in countercurrent contact with carbon tetrachloride admitting through tube 411. $Cl_2O$ and $Cl_2$ gases are dissolved in the $CCl_4$ and may be withdrawn via liquid drain line 361 through drain cock 371.

The effluent gas, substantially depleted in $Cl_2O$ and $Cl_2$, passes out of gas outlet tube 421 to bulbous chamber 342. The gas passes upwardly through secondary absorption chamber 13 in countercurrent contact with $CCl_4$ admitted through tube 412. The residual gases, $Cl_2O$ and $Cl_2$, dissolve in the $CCl_4$ and they may be withdrawn via liquid drain line 362 via drain cock 372.

The effluent gas passes out of gas outlet tube 422 to storage vessel 343. The gas passes upwardly through gas washing vessel 14 in countercurrent contact with an aqueous solution, of the conventional strength, of NaOH and $Na_2SO_3$. The solution in storage vessel 343 is an aqueous solution of NaCl, NaOH, $Na_2SO_3$, and $Na_2SO_4$. The solution may be drawn off via liquid drain line 363 via drain cock 373. The gas exhausted via gas exhaust line 423 contains no substantial quantities of either $Cl_2$ or $Cl_2O$.

Figure 2:
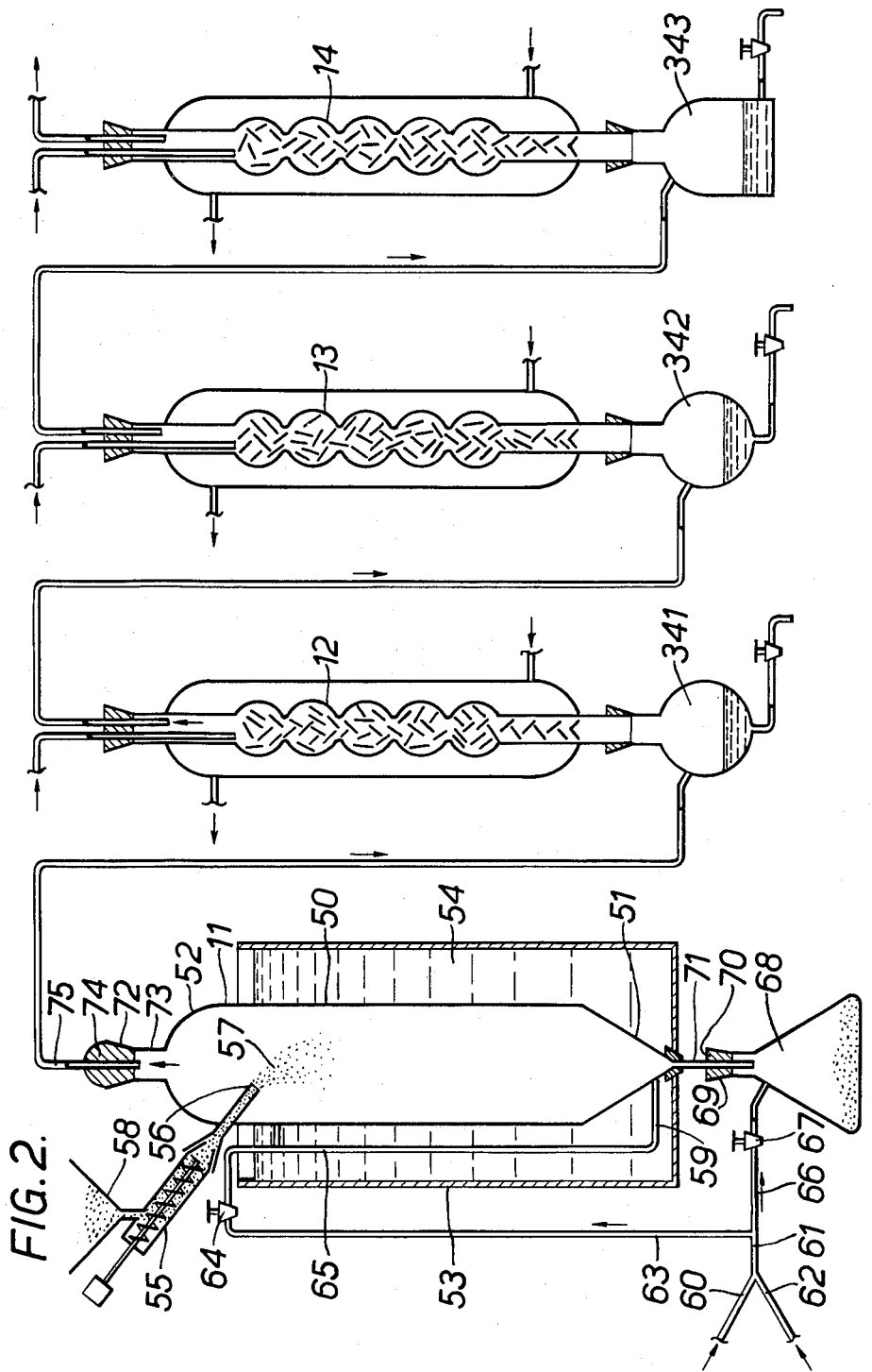
FIG. 2 is a diagram showing the laboratory equipment for producing $Cl_2O$ gas using a continuous process according to an aspect of this invention.

Description of Figure 2

Turning now to FIG. 2, it is seen that FIG. 2 differs from FIG. 1 only in the reaction vessel portion 11. The remainder of the components and their interrelation will not be described again.

Turning to the reaction section 11, it is seen to consist of an elongated cylindrical chamber 50 including a conical base 51 and a dome cap 52. The cylindrical chamber 50 is immersed in a constant temperature bath 53 containing water 54 at the desired temperature.

Solid reactant is fed continuously into chamber 50 by means of screw conveyor 55 discharging at 56 to provide downwardly falling reactant 57. Solid reagent is fed into screw conveyor 55 by means of funnel 58. As the solid reactant 57 falls downwardly in chamber 50, it is reactant with upwardly moving reactant gas/diluent gas, at the required temperature admitted via inlet line 59 to conical base 51. Reactant gas ($Cl_2$) is admitted via line 60 to mix, at conduit 61 with diluent gas ($N_2$, $O_2$ or air) admitted via line 62. The gas mixture passes through main line 63, passes valve 64 and then downwardly in tube 65 through water bath 53 to inlet 59.

A branch line 66 conducts the gas mixture through valve 67 into container 68 into which excess solid reagent falls. Container 68 is connected to reaction chamber 50 by means of outlet tube 71 passing through gas-tight plug 70 fitted into the flared neck 69 of container 68. Excess solid reagent 57 thus passes through outlet tube 71 to container 68.

Dome 52 is provided with outwardly flared, at 72, outlet tube 73 fitted with gas-tight plug 74 provided with gas outlet tube 75, which is connected to bulbous container 341 in the same manner and for the same purpose as previously fully described for FIG. 1.

Figure 3:
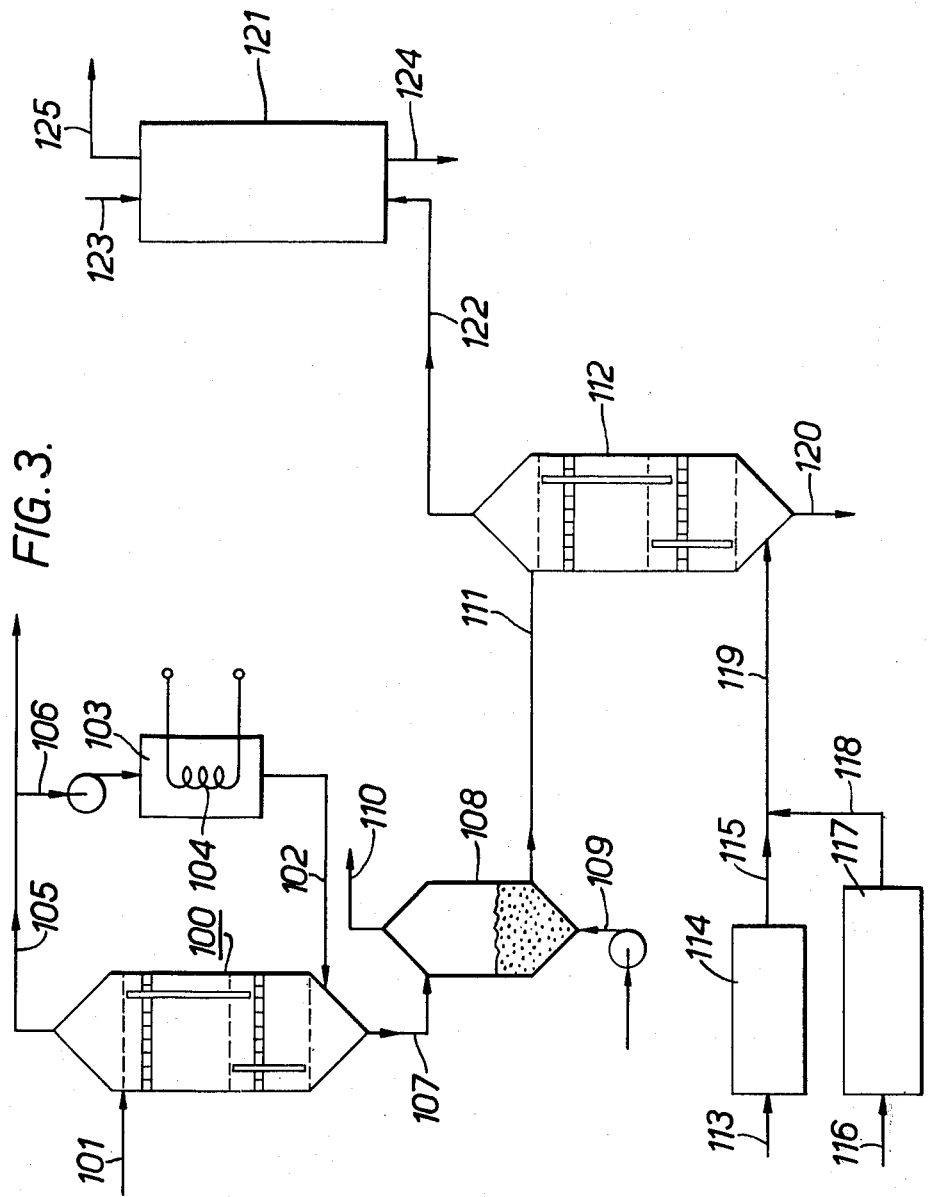
FIG. 3 is a flow sheet showing the use of a fluidized bed reactor in a commercial application for producing $Cl_2O$ gas according to an aspect of this invention.

Description of Figure 3

For large scale production of $Cl_2O$, fluidized bed arrangements may be used for the pretreatment of the solid feed and for the production of $Cl_2O$ in the reactor. This may be carried out using the embodiments of this invention as shown in FIG. 3. Dried and ground $NaHCO_3$ is fed into the fluidized bed calciner 100 via line 101 where it is exposed to a hot stream of gas via line 102. The hot gas is preferably $CO_2 + H_2O$ which is produced in the calcining reaction in the calciner 100 and heated in heating vessel 103 by means of heater 104 to a temperature within the range of 150°C. to 500°C. The solids in the calciner 100 are exposed for a time which varies inversely with the temperature and preferably for 90 to 30 minutes at 250°C. to 300°C. The surplus of the gas mixtures of $CO_2 + H_2O$ produced in the calcining reaction in calciner 100 is cautiously removed via line 105. Some of the excess gas is conveyed via line 106 to reactor 103 to be reheated for further use. The remainder is removed for further processing or waste removal (not shown). The porous $Na_2CO_3$ which is produced is withdrawn via line 107 to the top of cooler 108. Cool air is fed in via line 109 and hot air is removed via line 110. The cooled $Na_2CO_3$ is withdrawn from cooler 108 via line 111 to the top of the fluidized bed reactor 112. Chlorine gas in line 112 is passed through a conventional dryer 114 and the dry chlorine gas emerges from line 115. Diluting gas which may be $N_2$, $O_2$ or air is fed via line 116 to an apparatus 117 to control the moisture to within the range of 5% and 95% relative humidity at a saturation which varies directly with decreasing temperature, preferably between 20 percent and 25 percent saturation at 20°C. and above 60 percent at 0°C. The effluent of controlled moisture diluting gas in line 118 where it is mixed with the dry chlorine gas in line 115 passes to inlet line 119. The mixture of dry $Cl_2$ and moist diluting gas is fed into the reactor 112 via line 119 and kept at a temperature of −30°C. to +30°C. The solid reaction product containing NaCl and traces of $NaClO_3$, $Na_2CO_3$ and $NaHCO_3$ is withdrawn from the bottom of the reactor 112 via line 120.

The gaseous product of the reaction in fluidized bed reactor 112, comprising $Cl_2O + CO_2$ + diluting gas is fed directly to the bottom of a bleaching reactor 121 via line 122. Pulp is fed into reactor 121 via inlet 123, and bleached pulp is withdrawn via outlet 124. Diluting gas and $CO_2$ are withdrawn via line 125.

Figure 4:
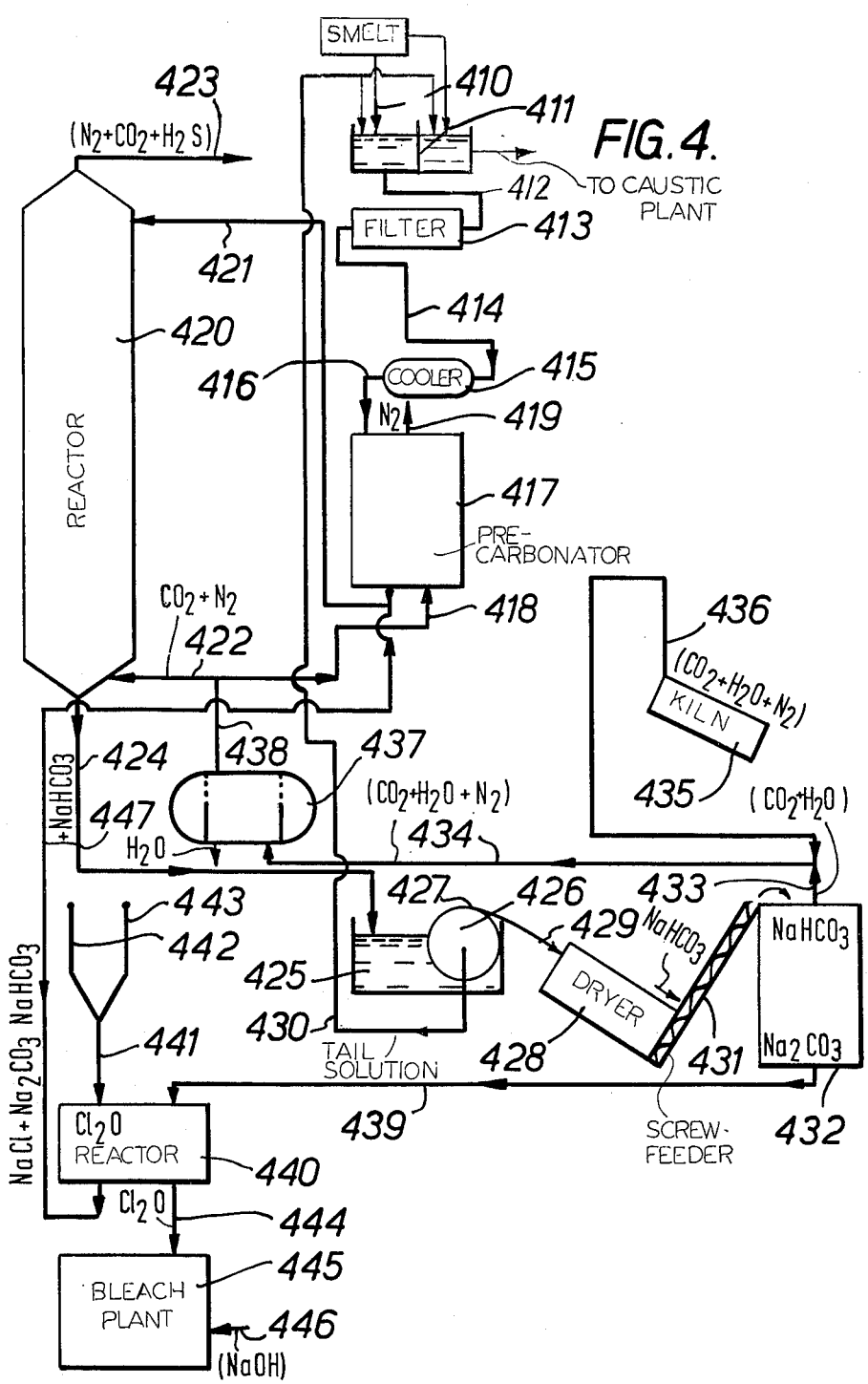
FIG. 4 is a schematic flow diagram of one system, according to an aspect of this invention, for the preparation of chlorine monoxide using, as one reactant, sodium carbonate formed from sodium bicarbonate derived from green liquor from a pulp mill.

Description of Figure 4

As mentioned hereinabove, another source of highly reactive porous sodium carbonate may be derived from green liquor from a pulp mill in accordance with a further embodiment of this invention which will be described further with reference to FIG. 4.

Green liquor is an aqueous alkaline solution of smelt containing, as main components, $Na_2S$ and $Na_2CO_3$ usually in amounts of about 25 to 55 grams/liter of $Na_2S$ and 100 to 140 grams/liter of $Na_2CO_3$. Other residual salts are also contained in the green liquor. For example, green liquor may contain NaCl originating from the salt content of the wood and/or from the wash water of the bleaching operations, if this is used for washing brown stock, and $Na_2S_2O_3$ and $Na_2SO_3$, and $Na_2SO_4$, in concentrations that depend upon the operation of the conventional kraft recovery furnace. A content of from 15 to 25 grams/liter NaOH, as found in green liquor prepared by conventional methods, originates from the use of wash water of dregs and lime mud as make-up water of the green liquor. The reaction of the main components of the green liquor with $CO_2$ and $H_2S$ as taught in the Sivola-Lurgi process of U.S. Pat. Nos. 2,702,763 and 2,730,445 follows the following equation:

$$Na_2CO_3 + CO_2 + H_2O \rightarrow 2NaHCO_3$$

Over a wide temperature range, the solubility of any $NaHCO_3$ obtained from green liquor by complete coversion on $Na_2CO_3$ is so low that most of the $NaHCO_3$ is present as a suspension. This is even more pronounced if the solubility of the sodium bicarbonate is suppressed by the presence of other sodium salts, e.g. NaCl, in high concentration.

In a reactor which receives green liquor from the top and $CO_2$ from below, the chemical reaction discussed above leads to an alteration of the chemical composition of the liquor, namely that $Na_2CO_3$ in passing downwardly is converted to $NaHCO_3$, which forms a deposit due to its low solubility in the tail solution which contains mainly residual salts. Consequently, one may remove, from the bottom of the reactor, a slurry of $NaHCO_3$ crystals in the tail solution.

Turning now to FIG. 4, the smelt is admitted via inlet line 410 to at least two separate sections 411a and 411b of the smelt dissolving tank 411 where it is initially dissolved in water to form the green liquor. ("Smelt" is a term well known in the art and represents a mixture of molten salts that collect at the bottom of the recovery furnace.) The green liquor from one of the sections 411b of the smelt dissolving tank 411 is conducted to a conventional caustic plant via line 411c, while the green liquor from the other section 411a which contains sufficient NaCl to suppress the solubility of $NaHCO_3$ efficiently is led via a first outlet line 412 to a filter 413. The outlet from the filter 413 passes via a filtered liquor line 414 to a cooler 415 from whence it is admitted via primary inlet line 416 to a precarbonator 417. In the precarbonator 417, the green liquor is subjected to the primary pre-reaction with carbon dioxide, which is admitted through a gas inlet line 418 and excess gases, including $N_2$, are removed via a primary gas removal line 419.

The precarbonated green liquor, which may be partially in slurry form, is fed to the top of a reactor 420 through an inlet line 421 where it passes downwardly countercurrently to an upwardly moving gaseous mixture containing carbon dioxide gas admitted at the bottom of the reactor 420 through a reactant gas inlet line 422. Unreacted reaction gas and gaseous products of reaction, e.g. $H_2S$, are removed through a gas outlet line 423 at the top of the reactor 420. The tail solution containing a slurry of $NaHCO_3$ is removed from a product removal line 424 at the bottom of the reactor 420 and passes to a water washing tank 425. It is washed with water. The slurry is filtered, preferably by means of a rotating perforated drum 426 and the solid $NaHCO_3$ is doctored off by a doctor blade, diagrammatically shown as 427, and passed to a $NaHCO_3$ dryer 428 via conveyor line 429. A fraction of the filtered aqueous solution (which is a solution containing some $NaHCO_3$, NaCl, $Na_2S_2O_3$, $Na_2SO_3$ and $Na_2SO_4$, and which is known as the "tail solution") is passed via a recycle line 430 back to section 411a of the smelt dissolving tank 411. From the remaining fraction, the salt may be recovered, or this fraction may be discharged, via line 430a.

The dried $NaHCO_3$ is fed via a screw feeder 431 to the top of a calcining chamber 432 where it is calcined as it slowly moves downwardly in the chamber 432. The released gases, containing principally $CO_2$ and $H_2O$, are removed via a gas outlet line 433 and passed to a primary reaction gas line 434. Additional carbon dioxide gas, as needed, is provided by calcining limestone in a kiln 435 and the gaseous products containing $CO_2$, $H_2O$ and $N_2$ are passed through a gas discharge line 436 to mix with the released gases from the $NaHCO_3$ calciner 432 in primary reaction gas line 434. These gases pass through a condenser 437, to remove the liquid $H_2O$ therefrom, and the gases consisting substantially essentially of $CO_2$ and $N_2$ are then passed by a gas-conducting line 438 to a primary reactant gas line 422. Here, the gas flow is split so that part of the gas may flow to the reactor 420 and part of the gas may flow to the precarbonator 417.

The finely divided porous $NA_2CO_3$ is passed via line 439 to a chlorine monoxide reactor 440 where it is reacted with a gaseous reactant admitted through line 441, comprising dry chlorine gas from line 442 mixed with a moist diluent gas in line 443, e.g. moistened oxygen, air or nitrogen which has been moistened by passing it through water at a controlled temperature prior to being used as a diluent, the reaction taking place at a temperature of −20°C. to +30°C. in a manner which has previously been fully described and which will not be described hereinafter. The chlorine monoxide gaseous effluent is passed via line 444 directly to a bleach plant, shown diagrammatically as 445, where it is used for the bleaching of pulp, in a manner which has been previously generally described. Caustic soda for the bleaching is admitted through line 446. The other effluent from the chlorine monoxide reactor and consisting essentially of NaCl, $Na_2CO_3$ and $NaHCO_3$ is passed via by-product line 447 to the product effluent line 421 of the precarbonator 417 where it is mixed therewith and eventually passed to the reactor 420.

With respect to bleaching with chlorine monoxide, this generally may take place in five stages, namely first, third and fifth chlorine monoxide stages and second and fourth sodium hydroxide stages. The amounts of chlorine monoxide and sodium hydroxide on an air-dry pulp basis are as follows, namely about 3 percent in $Cl_2O$ in the first stage, about 0.7% $Cl_2O$ in the third stage and about 0.2% $Cl_2O$ in the fifth stage, for a total of about 3.9% $Cl_2O$; about 3.0% NaOH (about 2.3% $Na_2O$) in the second stage, and about 1% NaOH (about 0.78% $Na_2O$) in the fourth stage, for a total of about 4.0% NaOH (about 3.1% $Na_2O$).

The amount of $NaHCO_3$ required for the production of $Cl_2O$ at about 71.5%

$$\text{efficiency} = \frac{(3.9/0.715)(2\text{NaHCO}_3)}{\text{Cl}_2\text{O}} = \text{about}$$

10.5% on air-dry pulp.

As has been described hereinabove, it is now taught that $Cl_2O$ can be produced efficiently by the reaction of $Cl_2$ with pure and dry porous finely divided $Na_2CO_3$ according to the equation $2Cl_2 + Na_2CO_3 \rightarrow Cl_2O + 2NaCl + CO_2$ and that highly reactive $Na_2CO_3$ for this purpose is preferably produced by calcining $NaHCO_3$ at about 250°C. to about 350°C. for ten to thirty minutes. As to the purity of the $Na_2CO_3$, it is important that the contents of catalysts of undesirable side reactions such as $$2Cl_2 + 2Na_2CO_3 \rightarrow 4NaCl + O_2 + 2CO_2$$

be kept at a minimum. Known catalysts of such side reactions are ions of heavy metals, for example, of nickel, iron and copper, all of which form insoluble sulphides with $Na_2S$. Applicant has shown that green liquor from kraft mills can be used for the efficient production of $Cl_2$.

In one experiment for the production of $NaHCO_3$, $CO_2$ was bubbled through filtered specimens of settled and unsettled green liquor. The $NaHCO_3$ obtained settled easily and was filtered off with a high-porosity filter, to be washed with water. Drying at a slightly elevated temperature was followed by an increase of the temperature to a calcining temperature of about 300°C. in fifteen minutes. This temperature was kept for fifteen minutes while $N_2$ was blown through the furnace over the salt being calcined. After this treatment, titration with 0.1 NaCl indicated completed or substantially complete conversion to $Na_2CO_3$.

Exposure at 14°C. of the $Na_2CO_3$ produced from settled and filtered green liquor to a gas mixture of 11.5% dry $Cl_2$ in $O_2$, $O_2$ being moistened by passing through water at 0°C., led to the production of a gas mixture in which 95 percent of the $Cl_2O + Cl_2$ mixture was $Cl_2O$ produced at 80 percent efficiency. Even in settled but unfiltered liquor, over 80% $Cl_2$ in the $Cl_2O + Cl_2$ gas mixture was obtained at 70 percent efficiency.

Accordingly, by this embodiment, applicant has shown that filtered and cooled green liquor, upon being fed to the top of a reactor, with carbon dioxide being fed to the bottom of the reactor, followed by controlled carbonization, is subdivided into a deposit of $NaHCO_3$, and a tail solution containing residual salts such as $Na_2SO_4$ and NaCl. The $NaHCO_3$ may be calcined to produce porous $Na_2CO_3$ which is eminently suitable for the production of $Cl_2O$.

DESCRIPTION OF EMBODIMENTS OF THE INVENTION

Description of Comparative Experiments

A series of Experiments were carried out to provide a basis for comparison between the prior art and the present invention. The Experiments were as follows:

Experiment No. I — Example I in U.S. Pat. No. 2,157,524

Experiment No. II — Example I in U.S. Pat. No. 2,157,525

Experiment No. III — Example II in U.S. Pat. No. 2,157,525

Experiment No. IV — Example III in U.S. Pat. No. 2,157,525

Experiment No. V — Example IV in U.S. Pat. No. 2,157,525

Experiment No. VI — Example V in U.S. Pat. No. 2,157,525

Experiment No. VII — The Example in U.S. Pat. No. 2,240,342.

(U.S. Pat. Nos. 2,157,524; 2,157,525; and 2,240,342 were previously referred to on page 1).

The results, summarized in Table 1, show that, while in Cady's experiments efficiency of utilization of $Cl_2$ was quite good, reaching an average of about 76 percent and a maximum of about 100 percent, the per cent yield, i.e. % chlorine monoxide in the chlorine monoxide-containing portion of the product gases, was strikingly low, being a maximum of only about 14 percent, with the average being about 7.4 percent.

TABLE 1

| Experiment No. | Solid Chemical | Gas Fed diluting gas | Gas Fed % by vol. $Cl_2$ | Ratio $Cl_2$ wt. to solids wt. used | Ratio $Cl_2$ wt. to solids wt. stoichiom. | T °C. | Gas Produced $Cl_2$ % | Gas Produced $Cl_2O$ % | Efficiency % | % $Cl_2O$ in $Cl_2O + Cl_2$ mixture |
|---|---|---|---|---|---|---|---|---|---|---|
| I | $Na_2CO_3 \cdot H_2O$ | $CO_2$ gas mixture humidified at 16°C. | 11.23 | — | — | 30 | 8.53 | 1.35 | 104 | 14 |
| II | NaOH + 0.5% $H_2O$ | air $Cl_2$ humidified | 25 * | 20:1 | 1.70:1 | 20–30 | 22.5 | 0.9 | 72 | 3.8 |
| III | $Na_3PO_4 \cdot 12H_2O$ | air $Cl_2$ humidified | 25 * | 1.8:1 | — | 20–30 | 21.25 | 0.98 | 52 | 4.4 |
| IV | $Na_2CO_3 \cdot H_2O$ | $CO_2$ $Cl_2$ humidified | 25 * | 14.2:1 | 1.14:1 | 20–30 | 22.5 | 1.06 | 85 | 4.5 |
| V | $Na_4SiO_4$ + 42% $H_2O$ | air $Cl_2$ humidified | 25 * | 5.64:1 | — | 20–30 | 21.25 | 1.03 | 55 | 4.6 |
| VI | $Na_2CO_3$ anhydr. | $CO_2$ $Cl_2$ humidified | 10 * | 15:1 | 1.34:1 | 160 | — | 0.2 | — | — |
| VII | $Na_2CO_3$ "dry" | $CO_2$ gas mixture humidified at 16°C. | 11.2 | — | — | 30 | — | 1.25 | 90 | 12.9 |

* not clearly shown in data.

A second set of 19 experiments were carried out to provide a further basis for comparison between the prior art and the present invention.

Experiments VIII – XVII were carried out generally as follows, with the differences being evident from the content of Table II.

$Na_2CO_3$ powder filled into a glass vessel was stirred, while a moistened mixture of 65 mils per minute $Cl_2$ diluted with 1000 mils per minute air was passed through. The reacted gas mixture was then passed through three columns in counterflow to $CCl_4$ (flow of 130 to 140 mils $CCl_4$ per minute in the first and second column and 400 mils per minute in the third column) to absorb all $Cl_2$ and $Cl_2O$. The content of $Na_2CO_3$ and $H_2O$ of the solids was analyzed before the reaction and that of $Na_2CO_3$, $NaHCO_3$, $NaClO_3$ and $NaCl$ after the reaction.

Experiments XVIII – XXVI were carried out generally as follows, with the differences being evident from the content of Table II.

The procedure followed in these was the same as in Experiments VIII – XVII, except that 80 to 95 mils $CCl_4$ per minute were used in the first and second columns and 50 mils per minute of a solution of 112 g/l NaOH, 75 g/l $Na_2SO_3$ in the third absorption column. Under these conditions a fraction of $Cl_2$ escaped and the $Cl_2O$ ratio figures are up to about 10 percent too high.

The conditions and results of these experiments are summarized in the Tables II and III attached hereto. Table II describes the types of solids, the content of moisture, the ratio of the experimentally used $Cl_2$ to the stoichiometric $Cl_2$, the reaction temperature, the % $H_2O$ in the air used as diluent and in $Cl_2$, the $Cl_2O$ ratio, the ratio 100 ($NaClO_3$) to ($Cl_2O$) and the % reacted $Cl_2$ used to produce (a) undesirable Cl-products and (b) desirable Cl-products, all values of Cl-compounds expressed as content of Cl in grams.

Table III lists the quantity of solids, the % $Na_2CO_3$ and % $H_2O$ of the solids fed, the content of $Na_2CO_3$ and $NaHCO_3$ of the solids obtained, the reaction products as gram Cl of $Cl_2O$, $Cl_2$, $NaClO_3$ and $NaCl$, and the total quantity of Cl recovered as (as grams Cl).

From these data in Tables II and III below, the following conclusions may be drawn in the comparison of Cady's conditions with those of the present invention:

a. The use of moist solids according to Cady as compared to the use of dry solids in the present invention leads to strong increase of undesirable side reactions as compared to the formation of $Cl_2O$ (Exp. VIII – X and XVIII – XXII to XI – XVII and XXIII – XVI.).

b. Increased temperature causes an increased rate of $NaClO_3$ formation (Exp. VIII – XII and XVIII – XXI versus XIII – XVII and XXII – XVI).

c. High $Cl_2$ surplus versus below — stoichiometric $Cl_2$ (Exp. VIII and IX and XVIII to XX versus X to XVII and XXI to XVI) leads to low $Cl_2O$ ratio.

d. Large surface area promotes the reaction. If this is obtained by mechanical means, e.g. in a ball mill, the solids become much more sticky than those made porous by calcining.

e. A low content of moisture suppresses the formation of $NaHCO_3$ as compared to high content of moisture at equal content of residual $Na_2CO_3$.

f. The results obtained at the combined conditions taught by Cady (moist solids, moist $Cl_2$ and dry diluent, temperature of 20° to 30°C., high surplus $Cl_2$) in Experiments VIII, IX and XVIII to XX were 100 × $(Cl_2O)/[(Cl_2O) + (Cl_2)]$ = 0 to 15, which is in agreement with Cady's result (3.8 to 14), and the ratio 100 × $(NaCl_3)/(Cl_2O)$ is 4 to 20. This result compares with the results obtained at the optimum conditions of the present invention: dry solids, dry $Cl_2$, but moist air, temperature close to 0°C., no surplus of $Cl_2$, porous $Na_2CO_3$ (Exp. XV to XVII, XXV and XXVI where 100 × $(Cl_2O)/[(Cl_2 O) + (Cl_2)]$ = 74 to 93.5 and 100 × $(NaClO_3)/(Cl_2O)$ = 1.7 to 2.5, while the results at 22°C., Exp. XXIII and XIV lead to similar results in the $Cl_2O$ ratio: 100 × $(Cl_2O)/(Cl_2O) + (Cl_2)$ = 67 to 83 but the ratio: $(NaClO_3)/(Cl_2O)$ rises to 5.0 to 5.5.

Table II

Essential Conditions and Results of $Cl_2O$ Production

| Exp. No. | Solids Type | $H_2O$ % | Surf. area $m^2/g$ | Ratio[5] Exp. $Cl_2$ Stoich.$Cl_2$ | Temp. °C | % $H_2O$ in 1000 ml air/min | $Cl_2$ | $Cl_2O$ ratio $100(Cl_2O)$ $(Cl_2)+(Cl_2O)$ | 100 × $(NaClO_3)$ $(Cl_2O)$ | % reacted $Cl_2$ used to produce Undesirable Cl-products[6] | $Cl_2O$[7] |
|---|---|---|---|---|---|---|---|---|---|---|---|
| VIII | L.S.Ash[1] | 10 | about 2 | 1.90 | 28 | 0 | 1.79 | 0.0 | ∞ | 100 | 0 |
| IX | L.S.Ash | 10 | about 2 | 1.57 | 28 | 0 | 1.79 | 1.0 | 0.167 | 98 | 2 |
| X | L.S.Ash | 10 | about 2 | 0.326 | 28 | 0 | 3.7 | 47.7 | 0.093 | 45 | 55 |
| XI | $Na_2CO_3$calc.[2] | 0 | 2.18 | 0.288 | 28 | 1.77 | 0 | 78.9 | 0.074 | 23 | 77 |
| XII | $Na_2CO_3$ calc. | 0 | 2.18 | 0.286 | 28 | 1.79 | 0 | 82.3 | 0.064 | 23 | 77 |
| XIII | $Na_2CO_3$ calc. | 0 | 2.18 | 0.294 | 22 | 1.33 | 0 | 69.3 | 0.055 | 30 | 70 |
| XIV | $Na_2CO_3$ calc. | 0 | 2.18 | 0.285 | 22 | 1.06 | 0 | 82.9 | 0.050 | 23 | 77 |
| XV | $Na_2CO_3$ calc. | 0 | 2.18 | 0.256 | 1° | 0.34 | 0 | 80.9 | 0.023 | 21 | 79 |
| XVI | $Na_2CO_3$ calc. | 0 | 2.18 | 0.288 | 1° | 0.34 | 0 | 74.0 | 0.018 | 17 | 83 |
| XVII | $Na_2CO_3$ calc. | 0 | 2.18 | 0.159 | 1° | 0.34 | 0 | 74.1 | 0.037 | 25 | 75 |
| XVIII | $Na_2CO_3.H_2O$[3] | 14.5 | 0.33 | 2.66 | 28 | 0 | 3.5 | 0.5 | 20.7 | 56 | 44 |
| XIX | L.S.Ash[2] | 10 | about 2 | 1.72 | 28 | 0 | 1.79 | 4.1 | 7.3 | 48 | 52 |
| XX | L.S.Ash | 10 | about 2 | 1.21 | 28 | 0 | 1.79 | 14.6 | 4.2 | 37 | 63 |
| XXI | L.S.Ash | 10 | about 2 | 0.270 | 28 | 0 | 3.5 | 88.1 | 20 | 38 | 62 |
| XXII | $Na_2CO_3 \times H_2O$ | 14.5 | 0.33 | 0.245 | 1 | 0.34 | 0 | 59.6 | 13 | 22 | 78 |
| XXIII | L.S.Ash[2] | 0 | about 2 | 0.249 | 1 | 0.34 | 0 | 60.0 | 1.4 | 3 | 97 |
| XXIV | $Na_2CO_3$[3]anh[4] | 0 | 0.717 | 0.206 | 1 | 0.34 | 0 | 70.7 | 1.3 | −1 | 101 |
| XXV | $Na_2CO_3$ calc[4] | 0 | 2.18 | 0.258 | 1 | 0.34 | 0 | 86.0 | 2.3 | 6 | 94 |
| XXVI | $Na_2CO_3$ calc[4] | 0 | 4.7 | 0.256 | 1 | 0.34 | 0 | 93.5 | 1.8 | 6 | 94 |

Footnotes to Table II:
(1) L.S. Ash - light soda ash
(2) calc. = calcined
(3) ball milled
(4) anh. = anhydrous (5) Ratio: Experimental $Cl_2$/Stoichiometric $Cl_2$ = $\dfrac{\text{total } Cl_2 \text{ grams}}{Na_2CO_3, \text{ grams} \times 1.34 \text{ fed}}$ where $1.34 = \dfrac{2 Cl_2}{Na_2CO_3} = \dfrac{142}{106}$ (6) $100 \times \dfrac{(NaCl) + (NaClO_3) - (Cl_2O)}{(NaCl) + (NaClO_3) + (Cl_2O)}$ (7) $100 \times \dfrac{Cl_2O}{(NaCl) + (NaClO_3) + (Cl_2O)}$

Table III

Additional Data on Cl₂O Production

| Exp. No. | Quant. g | Solids fed Na₂CO₃ % | H₂O % | Solids obtained Na₂CO₃ % on Na⁺ | NaHCO₃ | Cl₂O g Cl | React. Cl₂ g Cl | Prod. as g Cl NaClO₃ g Cl | NaCl g Cl | total g Cl in reaction Products |
|---|---|---|---|---|---|---|---|---|---|---|
| VIII | 1.615 | 89.4 | 10 | 62.3 | 10.1 | 0.000 | 3.460 | 0.008 | 0.202 | 3.670 |
| IX | 1.615 | 89.4 | 10 | 73.3 | 8.1 | 0.030 | 2.883 | 0.005 | 0.128 | 3.046 |
| X | 10 | 89.4 | 10 | 50.9 | 14.6 | 1.083 | 1.180 | 0.101 | 1.546 | 3.910 |
| XI | 10 | 99.0 | 0 | 49.6 | 14.6 | 1.469 | 0.393 | 0.108 | 1.858 | 3.828 |
| XII | 10 | 99.0 | 0 | 47.5 | 16.3 | 1.455 | 0.314 | 0.093 | 1.929 | 3.791 |
| XIII | 10 | 99.0 | 0 | 54.5 | 12.3 | 1.370 | 0.608 | 0.705 | 1.844 | 3.897 |
| XIV | 10 | 99.0 | 0 | 56.2 | 9.7 | 1.464 | 0.302 | 0.073 | 1.943 | 3.782 |
| XV | 10 | 99.0 | 0 | 67.2 | 3.7 | 1.332 | 0.315 | 0.030 | 1.716 | 3.393 |
| XVI | 10 | 99.0 | 0 | 64.7 | 5.9 | 1.580 | 0.554 | 0.029 | 1.759 | 3.822 |
| XVII | 20 | 99.0 | 0 | 80.6 | 2.3 | 1.580 | 0.553 | 0.059 | 2.014 | 4.206 |
| XVIII | 1.615 | 85.09 | 14.5 | 72.72 | 2.01 | 0.029 | 5.206 | 0.006 | 0.096 | 5.241 |
| XIX | 1.615 | 89.44 | 10 | 41.38 | 5.0 | 0.123 | 2.87 | 0.009 | 0.344 | 3.346 |
| XX | 1.615 | 89.44 | 10 | 48.07 | 5.0 | 0.260 | 1.526 | 0.011 | 0.559 | 2.356 |
| XXI | 10 | 89.44 | 10 | 31.38 | 13.19 | 0.965 | 0.130 | 0.193 | 1.972 | 3.260 |
| XXII | 10 | 85.09 | 14.5 | 54.06 | 3.61 | 0.861 | 0.585 | 0.112 | 1.248 | 2.806 |
| XXIII | 10 | 99.44 | 0 | 77.17 | 0.75 | 1.219 | 0.814 | 0.017 | 1.291 | 3.343 |
| XIV | 10 | 100.0 | 0 | 79.71 | 0.75 | 1.156 | 0.483 | 0.015 | 1.106 | 2.760 |
| XV | 10 | 99.0 | 0 | 68.48 | 1.63 | 1.510 | 0.245 | 0.035 | 1.660 | 3.450 |
| XVI | 10 | 99.0 | 0 | 64.50 | 0.92 | 1.563 | 0.112 | 0.028 | 1.724 | 3.427 |

In the development and perfection of the present invention, numerous further experiments, using both batch and continuous processes, were conducted. The following test conditions were held common for all experiments carried out using the batch process:

1. Time of reaction — 5 minutes
2. Temperature of the water bath through which the diluting gas being tested (air, CO₂, N₂ or O₂) was bubbled — 0°C.
3. Moist diluting gas.
4. Dry chlorine gas.

The amounts of Cl₂O and Cl₂ absorbed in the first two absorption vessels (12 and 13) were determined by standard methods of analysis. Under conditions of efficient Cl₂O production the remaining gas absorbed in the third vessel 14 was very low and was determined by Volhard's method of analysis for chlorine determination.

EXPERIMENTS XXVIII, XXIX, XXX AND XXXI

An untreated form of sodium bicarbonate was reacted using the experimental conditions of Experiments I – VI with the exception of maintaining a stoichiometric balance between the amounts of chlorine gas and the pretreated solids. The temperature of the water bath used to moisten the diluting gas was 0°C., which produced a partial pressure of H₂O of 8.2 mm Hg, and the temperature of the chamber was 20°C. The results, shown in Table 2, show a yield, i.e. % chlorine monoxide in the chlorine monoxide-containing portion of the product gases, of Cl₂O production improved 100 percent over Cady's reported yield of about 14 percent.

These Experiments therefore demonstrate that if the stoichiometric balance is maintained between chlorine gas and the untreated dry solids throughout the reaction, instead of the surplus amount of chlorine gas proposed by the prior art, the yield, i.e. % chlorine monoxide in the chlorine monoxide-containing portion of the product gases, is improved to a value approaching about 26 percent.

TABLE 2

| Experiment No. | Feed Rate of gases (cc/min) | Total Cl₂ fed (g) | Cl₂O (g) | Cl₂ in Cl₂ (g) | NaOH (g) | NaCl (g) | Total Cl₂ (g) | % Cl₂O in Cl₂ + Cl₂O | Efficiency of Cl₂O Production % |
|---|---|---|---|---|---|---|---|---|---|
| XXVIII | O₂ = 500 Cl₂ = 108 | 1.593 | 0.258 | 0.632 | 0.010 | 0.670 | 1.570 | 26.1 | 55.6 |
| XXIX | O₂ = 500 Cl₂ = 108 | 1.593 | 0.162 | 0.815 | 0.010 | 0.355 | 1.342 | 16.6 | 62.3 |
| XXX | O₂ = 500 Cl₂ = 119 | 1.755 | 0.137 | 0.71 | 0.025 | 0.372 | 1.244 | 16.2 | 51.7 |
| XXXI | O₂ = 500 Cl₂ = 108 | 1.593 | 0.254 | 0.720 | 0.015 | 0.426 | 1.415 | 28.1 | 74.7 |

DESCRIPTION OF EXAMPLES OF EMBODIMENTS LEADING TO THE PROCESS OF THE INVENTION

EXAMPLES 1 – 3

Three examples were carried out, using the conditions of Experiments XXVIII – XXXI, but by pretreating the sodium bicarbonate solid reagent as follows: the sodium bicarbonate is pretreated by heating in a furnace at temperatures between 150°C. and 480°C. for a period of 10 minutes to 3 hours, preferably at temperatures ranging between 250°C. and 350°C. for 20 minutes to 40 minutes, in stagnant air or $N_2$ atmosphere; a porous $Na_2CO_3$ is formed due to the decomposition and removal of $CO_2$ and $H_2O$ respectively.

Figure 5:
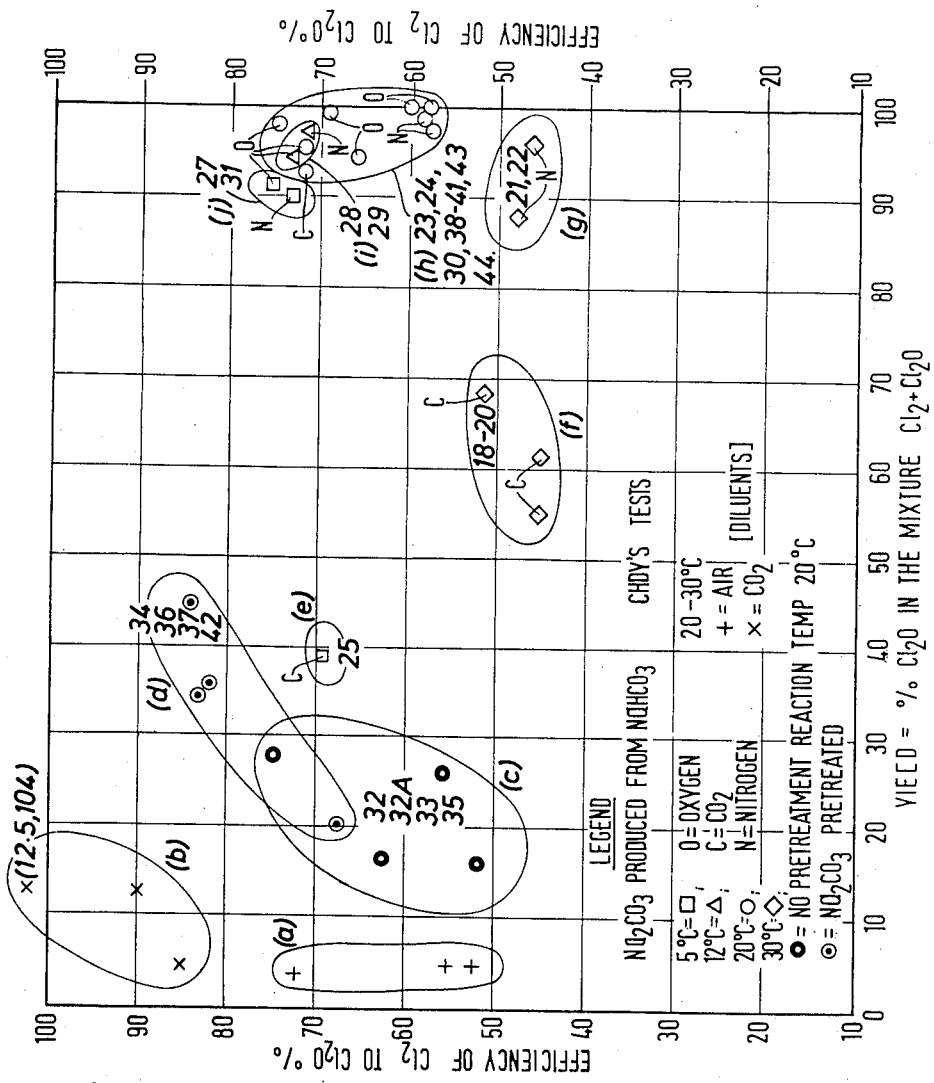
FIG. 5 is a graph showing the superior results of the batch process according to an aspect of this invention compared to the procedures of the prior art.

The results, summarized in Table 3, show that when this form of sodium carbonate is exposed to a mixture of dry chlorine and $CO_2$ moistened by being bubbled through water 25°C. and is reacted at 30°C., in an atmosphere of $CO_2$, the yield of $Cl_2O$ gas is improved still further by 100 percent, but that it is still not as high as the yield of $Cl_2O$ according to the present invention.

process over the prior art is given in the graph in FIG. 5, wherein the following is summarized. (In the description of the graph in FIG. 5 and in the later description of the graph in FIG. 6, the shape of the areas is of no significance, the delineated areas only being included for the sake of brevity of clarity in referring to the points on the graph.)

1. Tests enclosed by enclosure (a):
   Examples of the prior art, at reaction temperatures of 20° – 30°C. with air as the diluent;

TABLE 3

| Ex. No. | Pretreatment of $NaHCO_3$ | Feed Rate of gases cc/min. | Temp. of $H_2O$ react. bath °C. | Temp. chamber °C. | Total $Cl_2$ fed g. | $Cl_2O$ g. | $Cl_2$ in $Cl_2$ g. | $Cl_2$ in NaOH g. | NaCl g. | Total $Cl_2$ obtained g. | % $Cl_2O$ in $Cl_2 + Cl_2O$ | Eff. of $Cl_2O$ Production % |
|---|---|---|---|---|---|---|---|---|---|---|---|---|
| 1 | 1 h 155°C. | $CO_2 = 500$ $Cl_2 = 106$ | 25 | 30 | 1.504 | 0.240 | 0.152 | 0.042 | 0.82 | 1.254 | 61.2 | 45.3 |
| 2 | 1 h 180°C. | $CO_2 = 500$ $Cl_2 = 108$ | 25 | 30 | 1.593 | 0.216 | 0.171 | 0.040 | 0.73 | 1.157 | 55.1 | 45.7 |
| 3 | 1 h 175°C. | $CO_2 = 500$ $Cl_2 = 115$ | 25 | 30 | 1.696 | 0.308 | 0.142 | 0.017 | 0.89 | 1.357 | 68.5 | 51.4 |

EXAMPLES 4 – 18

The tests of Examples 1 – 3 were repeated but following the process of the present invention using $O_2$ and $N_2$ as diluting gases at reaction temperatures varying between 5°C. and 30°C. The results, shown in Table 4, show that improved yields, i.e. % chlorine monoxide in the chlorine monoxide-containing portion of the product gases, of about 90 – 100 percent were achieved, while the maximum efficiency of $Cl_2O$ production rose from about 51 percent to about 75 percent.

2. Tests enclosed by enclosure (b):
   Examples of the prior art, at reaction temperatures of 20° – 30°C. with $CO_2$ as a diluent;
3. Tests enclosed by enclosure (c):
   No pretreatment of solid reactant ($Na_2CO_3$ + $NaHCO_3$), reaction temperature 20°C., stoichiometric amounts of solid reactant;
4. Tests enclosed by enclosure (d):
   $Na_2CO_3$ pretreated, stoichiometric amounts, carbon dioxide diluent, reaction temperature = 20°C.;
5. Tests enclosed by enclosure (e):

TABLE 4

| Ex. No. | Pretreatment of $NaHCO_3$ | Feed rate of gases cc/min | Temp. of $H_2O$ react. bath °C | Temp. chamber °C | Total $Cl_2$ fed g | $Cl_2O$ g | $Cl_2$ in $Cl_2$ g | $Cl_2$ in NaOH g | NaCl g | Total $Cl_2$ obtained g | % $Cl_2O$ in $Cl_2 + Cl_2O$ | Eff. of $Cl_2O$ Production % |
|---|---|---|---|---|---|---|---|---|---|---|---|---|
| 4 | 1 h 175°C | $N_2 = 500$ $Cl_2 = 110$ | 25 | 30 | 1.623 | 0.354 | 0.026 | 0.003 | 1.17 | 1.553 | 93.3 | 46.4 |
| 5 | 1 h 175°C. | $N_2 = 500$ $Cl_2 = 113$ | 0 | 30 | 1.6667 | 0.351 | 0.0475 | 0.004 | 1.10 | 1.5025 | 88.19 | 48.35 |
| 6 | 1 h 175°C. | $N_2 = 500$ $Cl_2 = 125$ | 0 | 20 | 1.198 | 0.277 | 0.007 | 0.002 | 0.689 | 0.975 | 97.5 | 57.4 |
| 7 | 1 h 175°C. | $N_2 = 500$ $Cl_2 = 117$ | 0 | 20 | 1.633 | 0.437 | 0.005 | 0.004 | 1.06 | 1.506 | 98.9 | 58.4 |
| 8 | 1 h 175°C. | $O_2 = 500$ $Cl_2 = 104$ | 0 | 5 | 1.54 | 0.443 | 0.042 | 0.004 | 0.73 | 1.219 | 91.3 | 75.5 |
| 9 | 1 h 175°C. | $N_2 = 500$ $Cl_2 = 118$ | 0 | 12 | 1.740 | 0.493 | 0.014 | 0.004 | 0.886 | 1.397 | 97.2 | 71.4 |
| 10 | 1 h 175°C. | $O_2 = 500$ $Cl_2 = 105$ | 0 | 12 | 1.549 | 0.480 | 0.028 | 0.004 | 0.83 | 1.342 | 94.5 | 73.3 |
| 11 | 1 h 175°C. | $O_2 = 500$ $Cl_2 = 110$ | 0 | 20 | 1.622 | 0.525 | 0.008 | 0.003 | 0.99 | 1.526 | 98.5 | 69.3 |
| 12 | 1 h 175°C. | $N_2 = 500$ $Cl_2 = 110$ | 0 | 5 | 1.622 | 0.459 | 0.055 | 0.002 | 0.850 | 1.366 | 89.9 | 73.0 |
| 13 | 1h 165°C in $N_2$ | $O_2 = 500$ $Cl_2 = 103$ | 0 | 20 | 1.519 | 0.391 | 0 | 0.002 | 0.957 | 1.350 | 100.0 | 58.1 |
| 14 | 1h 150°C in $N_2$ | $O_2 = 500$ $Cl_2 = 112$ | 0 | 20 | 1.652 | 0.417 | 0 | 0.001 | 0.975 | 1.393 | 100.0 | 59.9 |
| 15 | 10m 200°C in $N_2$ | $O_2 = 500$ $Cl_2 = 122$ | 0 | 20 | 1.800 | 0.515 | 0.029 | 0.004 | 1.046 | 1.594 | 94.7 | 66.0 |
| 16 | 1h 175°C in $N_2$ | $O_2 = 500$ $Cl_2 = 106$ | 0 | 20 | 1.564 | 0.427 | 0.011 | 0.001 | 0.798 | 1.237 | 97.5 | 69.8 |
| 17 | 20m 175°C in $N_2$ | $O_2 = 500$ $Cl_2 = 117$ | 0 | 20 | 1.726 | 0.554 | 0.025 | 0.003 | 0.993 | 1.575 | 95.7 | 71.6 |
| 18 | 20m 150°C in $N_2$ | $O_2 = 500$ $Cl_2 = 116$ | 0 | 20 | 1.711 | 0.552 | 0.028 | 0.003 | 0.993 | 1.576 | 95.1 | 71.4 |

DESCRIPTION OF EMBODIMENTS OF THE INVENTION WITH REFERENCE TO FIG. 5

A summary of the superior results of the process of one aspect of the present invention applied as a batch $Na_2CO_3$ pretreated, stoichiometric amounts, carbon dioxide diluent, reaction temperature = 5°C.;
6. Tests enclosed by enclosure (f):
   $Na_2CO_3$ pretreated, stoichiometric amounts, carbon dioxide diluent, reaction temperature = 30°C.;

7. Tests enclosed by enclosure (g):
   $Na_2CO_3$ pretreated, stoichiometric amounts, nitrogen diluent, reaction temperature = 30°C.;
8. Tests enclosed by enclosure (h):
   $Na_2CO_3$ pretreated, stoichiometric amounts, nitrogen or oxygen diluents, reaction temperature = 20°C.;
9. Tests enclosed by enclosure (i):
   $Na_2CO_3$ pretreated, stoichiometric amounts, oxygen or nitrogen diluents, reaction temperature = 12°C., and;
10. Tests enclosed by enclosure (j):
    $Na_2CO_3$ pretreated, stoichiometric amounts, oxygen or nitrogen diluents, reaction temperature = 5°C.

DESCRIPTION OF FURTHER EMBODIMENTS OF THE INVENTION

A further series of experiments were carried out to show the utility of another aspect of the process of this invention, namely a process for the continuous production of $Cl_2O$.

A first series of tests was directed to a study of the processes of bicarbonate pretreatment. Specimens of purchased sodium bicarbonate (Power, Reagent quality of Anachemic Chemicals) were exposed to various temperatures between 175°C. and 500°C. for various periods of time. The effects of this exposure on decomposition and surface area of the salt were determined after this exposure. The extent of decomposition of $NaHCO_3$ to porous $Na_2CO_3 + CO_2 + H_2O$ was determined by titration with 0.1 N HCl while the surface area (per gram of salt) was measured by the standard nitrogen adsorption techniques. Results indicate that complete decomposition and maximum surface area of the salt (5.2 m²/g) is achieved by heating for 90 minutes at 250°C. and also by heating for 30 minutes at 300°C. (4.8 m²/g). These figures represent only the time of exposure of $NaHCO_3$ powder to the maximum temperature, excluding the time of exposure to rising temperatures.

With further increasing reaction temperatures, the maximum surface area obtained by calcining was reached earlier but remained below the values reached when the calcining was carried out at 250°C. to 300C. For example, at 400°C. the maximum area was 3.1 m²/g determined after 7 minutes exposure and at 500°C. the maximum area was 1.1 m²/g reached after 2.5 minutes exposure. With further extended time, e.g. to 20 or 40 minutes at 400°C., the surface area dropped, respectively, to 1.8 and 0.7 m²/g, and at 500°C. the periods of heating were 5 and 10 minutes at which surface areas of 1.0 and 0.3 m²/g respectively, were obtained.

In order to determine the performance of pretreated $Na_2CO_3$ in the production of $Cl_2O$, a second set of experiments was carried out. Experimental data of some of these experiments are tabulated in Table 5. The following observations may be made with respect to Table 5:

1. The amount of $Cl_2O$ produced (in grams) in 70 minutes by reaction of the given $Cl_2 + O_2 + H_2O$ gas with 25 g $Na_2CO_3$ represents a measure of the total amount of $Cl_2O$ obtainable in short periods of exposure.
2. The yield in % $Cl_2O$ in the mixtures of $Cl_2 + Cl_2O$ achieved during the period of maximum yield represents a measure of the quality of the gas mixture obtainable.
3. The per cent efficiency of $Cl_2O$ production as per cent of the theoretically obtainable $Cl_2O$ is expressed as $100 \times (Cl_2O)/(½ Cl_2) + ½ NaCl)$. The values in the Table are given as gram Cl.
4. The ratio of the Cl contents of $(Cl_2O)(NaClO_3)$ is inversely proportional to the fraction of $Cl_2$ lost in $NaClO_3$ production (which is the main cause of $Cl_2$ loss under the selected test conditions). Improved performance is expressed by increased values in the figures given in these four numbered paragraphs. Optimum performance is indicated by an optimum value of the product of the figures given in the first three of these four numbered paragraphs. The figures given in the fourth of these four numbered paragraphs, which represents the main cause of loss, as expressed by decreasing efficiency, is given to show clearly the losses in the system, and its effect is indicated in the figures denoting efficiency.

The operating conditions for experiments Nos. 101 to 107 (Table 5) were arranged to derive the total quantity and the optimum yield and efficiency of $Cl_2O$ production in a continuous reactor at 20°C., using $Na_2CO_3$ produced by decomposition of $NaHCO_3$ at various temperatures. A mixture of dry chlorine and moistened oxygen (at an $H_2O$ vapour pressure of 8.2 mm of Hg in oxygen) was fed to the system. The oxygen was moistened by bubbling the gas through a water column at 0°C. The highest yield and efficiency of $Cl_2O$ production resulted in pretreatment temperatures of 250° – 300°C.; exposure time of 30 minutes, and at a $Cl_2$ feed rate of 105 – 108 cc/min.

By improving cooling of the water used for the moistening of oxygen, a slight decrease in moisture content of the diluting gas was obtained. This improvement resulted in a higher efficiency of production (Experiments 108 – 109 – Table 5 – Group B) and the total production of $Cl_2O$ rose substantially.

Experiments 110 and 111 (Table 5 - Group C), Experiments 112 and 113 (Table 5 - Group D) and Experiments 114 and 115 (Table 5 - Group E) were carried out making use of the improved cooling arrangement while the temperature of the reactor was lowered to 6°C. with an accompanying increase of the feed rate of $Cl_2$ from 58 to 82 and finally to 110 cc. $Cl_2$/min., improved values of $Cl_2O$ production and especially of efficiency of production were observed, whereas the yield decreased slightly. Lowering the reaction temperature to 0°C. and increasing the feed rate of $Cl_2$ to 150 cc. $Cl_2$/min. (Experiment 117 – Table 5 – Group G and Experiments 118 and 119 – Table 5 – Group H) did not result in any further improvement of $Cl_2O$ production.

TABLE 5 [1]

| Experiment | | Pretreatment | | Feed rates | | $H_2O$ | Reactor | $Cl_2O$ | RESULTS | | Ratio of Cl in $Cl_2O$ $NaClO_3$ |
|---|---|---|---|---|---|---|---|---|---|---|---|
| | | | | | | vapour press [2] | Temp | Produced (expressed | % $Cl_2O$ in | Eff. of $Cl_2O$ | |
| No. | Group | temp °C. | time min | $O_2$ | $Cl_2$ | mm Hg | °C. | in g. Cl) | $Cl_2$+$Cl_2O$ | Prod. | |
| 101 | A | 175 | 30 | 860 | 97 | 8.2 | 20 | 3.07 | 93 | 64 | 8.0 |

TABLE 5[1]—continued

| Experiment | | Pretreatment | | Feed rates cc/min | | $H_2O$ vapour press [2] mm Hg | Reactor Temp °C. | $Cl_2O$ Produced (expressed in g. Cl) | RESULTS | | Ratio of Cl in $Cl_2O$ $NaClO_3$ |
|---|---|---|---|---|---|---|---|---|---|---|---|
| No. | Group | temp °C. | time min | $O_2$ | $Cl_2$ | | | | % $Cl_2O$ in $Cl_2+Cl_2O$ | Eff. of $Cl_2O$ Prod. | |
| 102 | A | 200 | 30 | 860 | 105 | 8.2 | 20 | 2.77 | 98 | 73 | 11.4 |
| 103 | A | 250 | 30 | 860 | 108 | 8.2 | 20 | 3.23 | 100 | 69 | 8.7 |
| 104 | A | 300 | 30 | 860 | 108 | 8.2 | 20 | 3.06 | 90 | 70 | 10.0 |
| 105 | A | 400 | 10 | 860 | 103 | 8.2 | 20 | 3.41 | 94 | 64 | 7.7 |
| 106 | A | 500 | 5 | 860 | 114 | 8.2 | 20 | 2.14 | 92 | 68 | 7.7 |
| 107 | — | 500 | 10 | 860 | 106 | 8.2 | 20 | 0.63 | 42 | 71 | 11.8 |
| 108 | B | 300 | 30 | 860 | 113 | 6.7 | 20 | 4.28 | 82 | 79 | 11.5 |
| 109 | B | 300 | 30 | 860 | 107 | 6.7 | 20 | 4.09 | 87 | 77 | 11.1 |
| 110 | C | 300 | 30 | 860 | 57 | 6.7 | 6 | 4.26 | 100 | 78 | 11.9 |
| 111 | C | 300 | 30 | 860 | 60 | 6.7 | 6 | 4.42 | 97 | 78 | 12.0 |
| 112 | D | 300 | 30 | 860 | 82 | 6.7 | 6 | 5.70 | 95 | 81 | 14.4 |
| 113 | D | 300 | 30 | 860 | 82 | 6.7 | 6 | 5.65 | 98 | 80 | 14.0 |
| 114 | E | 300 | 30 | 860 | 112 | 6.7 | 6 | 5.88 | 94 | 85 | 16.0 |
| 115 | E | 300 | 30 | 860 | 108 | 6.7 | 6 | 5.83 | 95 | 83 | 15.2 |
| 116 | F | 300 | 30 | 860 | 85 | 4.2 | 6 | 5.55 | 95 | 83 | 15.5 |
| 117 | G | 300 | 30 | 860 | 85 | 6.7 | 0 | 5.61 | 91 | 80 | 14.5 |
| 118 | H | 300 | 30 | 860 | 110 | 4.2 | 0 | 5.82 | 92 | 84 | 17.6 |
| 119 | H | 300 | 30 | 860 | 150 | 4.2 | 0 | 5.02 | 84 | 85 | 20.0 |

[1] All experiments were carried out for 70 minutes time.
[2] $H_2O$ vapour pressure of oxygen, used as diluent.
[3] Yield reported is maximum observed during at least 10 minutes of 70-minute run.

DESCRIPTION OF FURTHER EMBODIMENTS OF THE INVENTION WITH REFERENCE TO FIG. 6

A summary of the excellent results of the present invention in continuous operation is given in the graph of FIG. 6, wherein the following is summarized:

1. Tests enclosed by enclosure (A):

$Na_2CO_3$ pretreated at temperatures between 175° and 500°C., stoichiometric amounts, oxygen diluent = 860 cc/minute moistened by 8.2 mm Hg $H_2O$ vapour pressure, chlorine = 97 to 114 cc/minute, reactor temperature = 20°C.

2. Tests enclosed by enclosure (B):

$Na_2CO_3$ pretreated at 300°C. for 30 minutes, stoichiometric amounts, oxygen diluent = 860 cc/minute moistened by 6.7 mm Hg $H_2O$ vapour pressure, chlorine = 107 to 113 cc/minute, reactor temperature 20°C.

3. Tests enclosed by enclosure (C):

$Na_2CO_3$ pretreated at 300°C. for 30 minutes, stoichiometric amounts, oxygen diluent = 860 cc/minute moistened by 6.7 mm Hg $H_2O$ vapour pressure, chlorine = 57 to 60 cc/minute, reactor temperature = 6°C.

4. Tests enclosed by enclosure (D):

$Na_2CO_3$ pretreated at 300°C. for 30 minutes, stoichiometric amounts, oxygen diluent = cc/minute moistened by 6.7 mm Hg $H_2O$ vapour pressure, chlorine = 82 cc/minute, reactor temperature = 6°C.

5. Tests enclosed by enclosure (E):

$Na_2CO_3$ pretreated at 300°C. for 30 minutes, stoichiometric amounts, oxygen diluent = 860 cc/minute, moistened by 6.7 mm Hg $H_2O$ vapour pressure, chlorine = 108 to 112 cc/minute, reactor temperature = 6°C.

6. Tests enclosed by enclosure (F):

$Na_2CO_3$ pretreated at 300°C. for 30 minutes, stoichiometric amounts, oxygen diluent = 860 cc/minute, moistened by 4.2 mm Hg $H_2O$ vapour pressure, which was obtained by bubbling oxygen through sulphuric acid of 1.25 g/cc density cooled from the outside, chlorine = 85 cc/minute, reactor temperature = 6°C.

7. Test enclosed by enclosure (G):

$Na_2CO_3$ pretreated at 300°C. for 30 minutes, stoichiometric amounts, oxygen diluent = 860 cc/minute moistened by 6.7 mm Hg vapour pressure, chlorine = 85 cc/minute, reactor temperature = 0°C.

8. Test enclosed by enclosure (H):

$Na_2CO_3$ pretreated at 300°C., for 30 minutes, stoichiometric amounts, oxygen diluent = 860 cc/minute moistened by 4.2 mm Hg vapour pressure, chlorine = 110 to 150 cc/minute, reactor temperature = 0°C.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. A process for directly preparing a chlorine monoxide in high yields in which the molar ratio of chlorine monoxide is not less than about 80% which comprises the combination of:

reacting (A) a solid compound selected from the group consisting of the carbonates and bicarbonates of the alkali metals, such solids being in a dry, highly reactive, porous, open-structure form having a surface area within the range of about 0.3 to about 5.2 m²/g and a specific gravity (weight per volume of powder) of about 1.06 to about 0.635 g/cm³, with (B) close to but not substantially more than a stoichiometric amount of chlorine gas in the form of a mixture of dry gaseous chlorine and moist diluent gas consisting essentially of air, oxygen and nitrogen, and mixtures thereof, the amount of said diluent being sufficient to provide a v/v ratio of diluent/$Cl_2O$ of at least 77/23 at (C) a temperature of about −20 °C. to about +30°C., while (D) monitoring the pH to remain at 9.5 or higher, the pH being measured by withdrawing solid reactant product, dissolving it in water, and measuring the pH of the resulting aqueous solution.

2. The process of claim 1 wherein the highly reactive porous alkaline agent is sodium carbonate formed by heating sodium bicarbonate to temperatures of about 150°C. to about 300°C. while removing the gaseous reaction products so formed.

3. The process of claim 1 wherein the diluent gas has a moisture content of about 5 to about 95 percent relative humidity, the relative humidity increasing with decreasing temperature.

4. The process of claim 1 wherein the diluting gas in moistened by passing it through an aqueous medium.

5. The process of claim 1 wherein the diluting gas is moistened by passing it through an aqueous medium at a temperature of about 0°C.

6. The process of claim 1 wherein the $v/v$ ratio of moist diluent/$Cl_2$ gas in the reactant gas is about 80/20.

7. The process of claim 1 wherein the reaction temperature is about 0°C. to about 20°C.

8. The process of claim 1 wherein the reaction temperature is about 0°C., the partial pressure of water vapour is about 2.5 to 7.0 mm Hg.

9. The process of claim 1 wherein the mixture of moist diluent gas and dry chlorine gas is maintained at a temperature of about −30°C. to about +30°C.

* * * * *